US012405578B2

(12) United States Patent
Mishima

(10) Patent No.: US 12,405,578 B2
(45) Date of Patent: Sep. 2, 2025

(54) TTIMEPIECE HAVING A DRIVING WHEEL INCLUDING A HOLE WITH PROJECTIONS DISENGAGEABLE WITH A CROWN SHAFT

(71) Applicant: SEIKO EPSON CORPORATION, Tokyo (JP)

(72) Inventor: Yoshio Mishima, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 433 days.

(21) Appl. No.: 17/855,868

(22) Filed: Jul. 1, 2022

(65) Prior Publication Data

US 2023/0010996 A1 Jan. 12, 2023

(30) Foreign Application Priority Data

Jul. 6, 2021 (JP) ................................ 2021-112007

(51) Int. Cl.
*G04B 27/04* (2006.01)
*G04B 13/02* (2006.01)

(52) U.S. Cl.
CPC ......... *G04B 27/045* (2013.01); *G04B 13/021* (2013.01)

(58) Field of Classification Search
CPC .... G04B 27/045; G04B 13/021; G04B 27/02; G04B 13/027; G04B 13/04; G04B 27/04
USPC .......................................................... 368/320
See application file for complete search history.

(56) References Cited

U.S. PATENT DOCUMENTS

| | | | | |
|---|---|---|---|---|
| 9,395,694 B1 * | 7/2016 | Wong | G04B 19/286 |
| 2002/0167866 A1 * | 11/2002 | Oomori | G04B 27/04 368/191 |
| 2007/0247978 A1 * | 10/2007 | Carrard | G04B 47/044 368/190 |
| 2018/0210397 A1 * | 7/2018 | Masone | G04B 27/02 |
| 2020/0133200 A1 * | 4/2020 | Nagasaka | G04B 15/14 |

FOREIGN PATENT DOCUMENTS

| | | | | |
|---|---|---|---|---|
| JP | 2002-328183 A | 11/2002 | |
| JP | 2007-292766 A | 11/2007 | |
| WO | WO-2004042478 A2 * | 5/2004 | G04B 27/04 |

OTHER PUBLICATIONS

Collin, A Brief Guide to Torx and Its (Many) Variations, KC Tool (Jun. 1, 2017), https://germantoolblog.com/2017/06/01/torx-and-its-many-variations/ (Year: 2017).*

* cited by examiner

*Primary Examiner* — Regis J Betsch
*Assistant Examiner* — Kevin Andrew Johnston
(74) *Attorney, Agent, or Firm* — Harness, Dickey & Pierce, P.L.C.

(57) ABSTRACT

A timepiece includes an inner rotating ring including a plurality of teeth portions; a driving crown including a head portion and a shaft portion; and a driving wheel including a hole portion engageable with and disengageable from the shaft portion, and configured to mesh with the teeth portions. The hole portion includes a plurality of protruding portions disposed at intervals of an angle smaller than 90° and protruding toward a rotation axis of the shaft portion.

7 Claims, 10 Drawing Sheets

TTIMEPIECE HAVING A DRIVING WHEEL INCLUDING A HOLE WITH PROJECTIONS DISENGAGEABLE WITH A CROWN SHAFT

The present application is based on, and claims priority from JP Application Serial Number 2021-112007, filed Jul. 6, 2021, the disclosure of which is hereby incorporated by reference herein in its entirety.

BACKGROUND

1. Technical Field

The present disclosure relates to a timepiece.

2. Related Art

For example, JP-A-2002-328183 discloses a wristwatch device including an inner rotating ring used as a display member disposed in a housing, an operation shaft that can be pushed into and pulled from the housing, and a clutch that transmits rotation of the operation shaft to the inner rotating ring.

However, in the technique of JP-A-2002-328183, when a large torque is required to rotate the inner rotating ring, for example, when a heavy inner rotating ring, an inner rotating ring with an improved click feeling, or the like is used, an engagement portion between a driving crown corresponding to the clutch and a driving wheel may slide, and thus rotation of the driving crown may not be transmitted to the inner rotating ring. That is, even when the driving crown is rotated, the inner rotating ring may not be rotated.

SUMMARY

A timepiece includes an inner rotating ring including a plurality of teeth portions; an operation part including a head portion and a shaft portion; and a driving wheel including a hole portion engageable with and disengageable from the shaft portion, and meshing with the teeth portions. The hole portion includes a plurality of projections disposed at intervals of an angle smaller than 90° and protruding toward a rotation axis of the shaft portion.

DESCRIPTION OF EXEMPLARY EMBODIMENTS

In each of the following drawings, three axes orthogonal to one another will be described as an X axis, a Y axis, and a Z axis. A direction along the X axis is referred to as an "X direction", a direction along the Y axis is referred to as a "Y direction", a direction along the Z axis is referred to as a "Z direction", a direction of an arrow is referred to as a + direction, and a direction at an opposite side from the + direction is referred to as a − direction. The +Z direction may be referred to as "upper" or "upper side", and the −Z direction may be referred to as "lower" or "lower side", and a view from the +Z direction is also referred to as a plan view or a plane. Description is made on the assumption that a surface on the +Z direction is an upper surface and a surface on the −Z direction at an opposite side from the +Z direction is a lower surface. In other words, it can be said that a direction from 3 o'clock to 9 o'clock of a timepiece is the X axis, a direction from 12 o'clock to 6 o'clock is the Y axis, and an axis orthogonal to the X axis and the Y axis is the Z axis.

First, a configuration of a timepiece 100 will be described with reference to FIG. 1.

Figure 1:
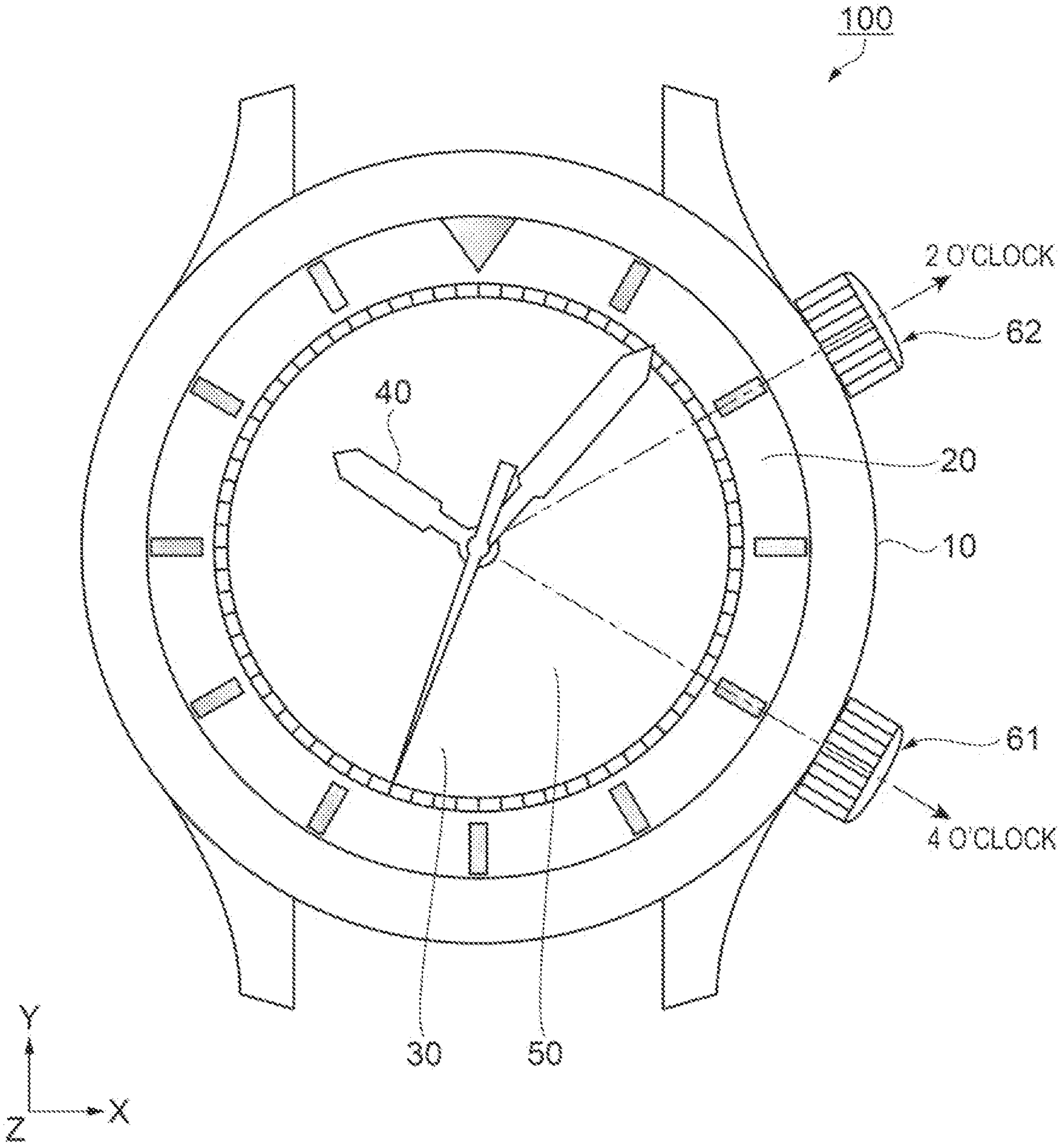
FIG. 1 is a plan view showing a configuration of a timepiece.

As shown in FIG. 1, the timepiece 100 includes a flat and cylindrical case 10. An inner rotating ring 20 and a dial 30 are disposed inside the case 10. Hands 40 including a second hand, a minute hand, and an hour hand are disposed at the dial 30. For example, a scale or the like is printed at a display surface side of the inner rotating ring 20.

A cover glass 50 is disposed on the case 10 to cover the inner rotating ring 20, the dial 30, and the hands 40. Time display can be visually recognized from a front surface side of the timepiece 100 through the cover glass 50. A surface on which the inner rotating ring 20 and the dial 30 are visually recognized is referred to as a display surface.

Although not shown, a movement that drives the hands 40 is accommodated inside the case 10. The movement includes a step motor and a wheel train that drive the hands 40, and a control circuit board that controls the driving of the step motor. The movement may be a mechanical movement using a spring as a power source.

Specifically, in a side surface of the case 10, driving crowns 61 and 62 for adjusting and setting the movement, the hands 40, the inner rotating ring 20, and the like are disposed respectively in a 4 o'clock direction and a 2 o'clock direction.

Next, configurations and functions of the inner rotating ring 20, the driving crown 61 as an operation part, and elastic members 70 will be described with reference to FIGS. 2 to 5.

Figure 2:
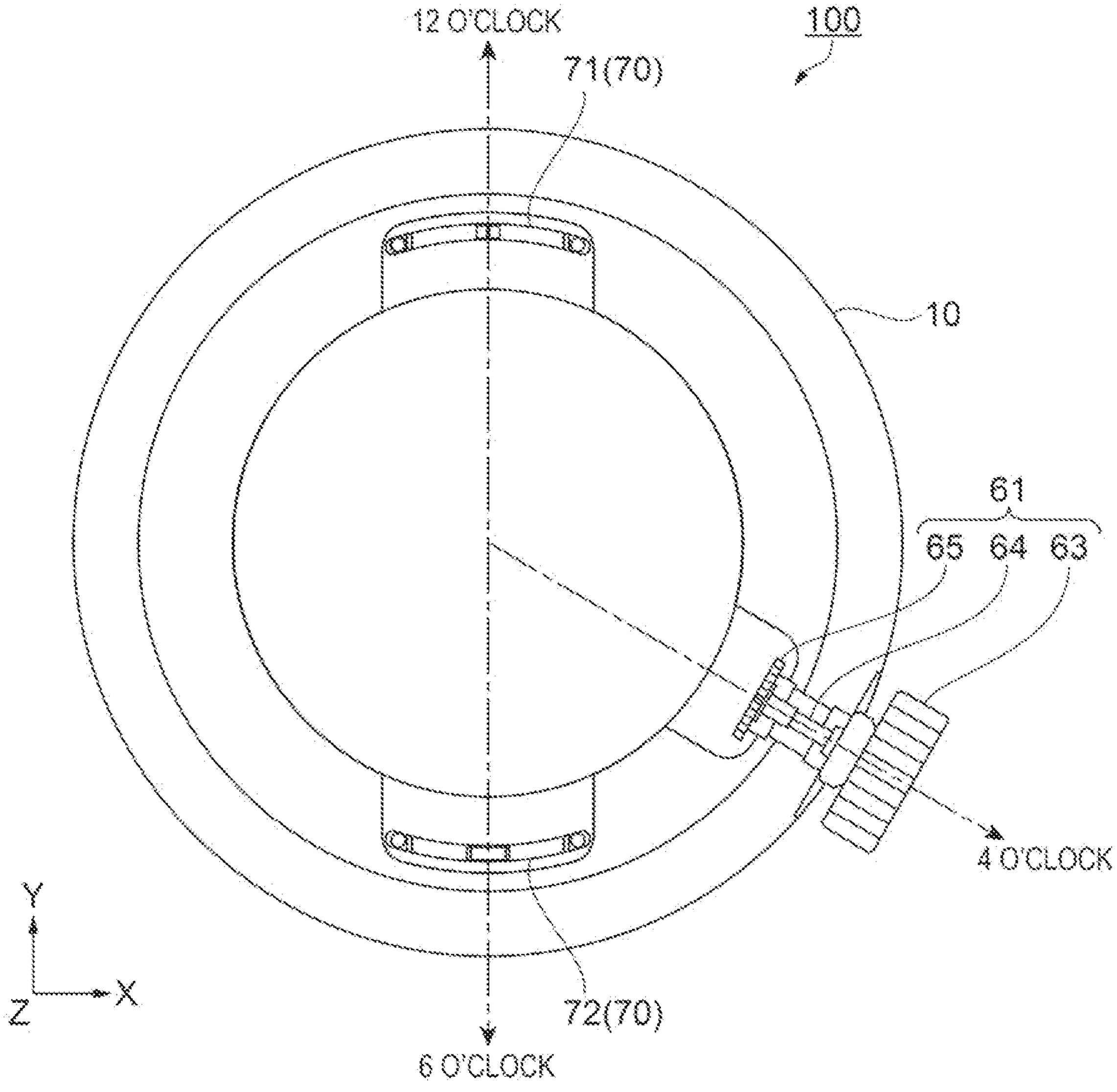
FIG. 2 is a plan view showing an internal configuration of the timepiece.

As shown in FIG. 2, the timepiece 100 includes the driving crown 61 disposed in the 4 o'clock direction in the case 10, a first elastic member 71 as one of the elastic members 70 disposed in a 12 o'clock direction, and a second elastic member 72 as the other of the elastic members 70 disposed in a 6 o'clock direction. That is, the second elastic member 72 is disposed at an opposite side in an in-plane direction of the inner rotating ring 20 from the first elastic member 71. Materials of the elastic members 70 are, for example, a resin.

The driving crown 61 includes a head portion 63, a shaft portion 64 coupled to the head portion 63, and a driving wheel 65 slidably coupled to the shaft portion 64. The driving wheel 65 may not be included in a configuration of the driving crown 61. When the head portion 63 is rotated in a state where the head portion 63 is pushed toward the case 10, the driving wheel 65 does not rotate since the shaft portion 64 and the driving wheel 65 do not mesh with each other. On the other hand, when the head portion 63 is pulled in a direction away from the case 10, the shaft portion 64 and the driving wheel 65 mesh with each other, and when the head portion 63 is rotated, the driving wheel 65 rotates. The shaft portion 64 is made of, for example, a metal material. The driving wheel 65 is made of, for example, a resin.

Figure 3:
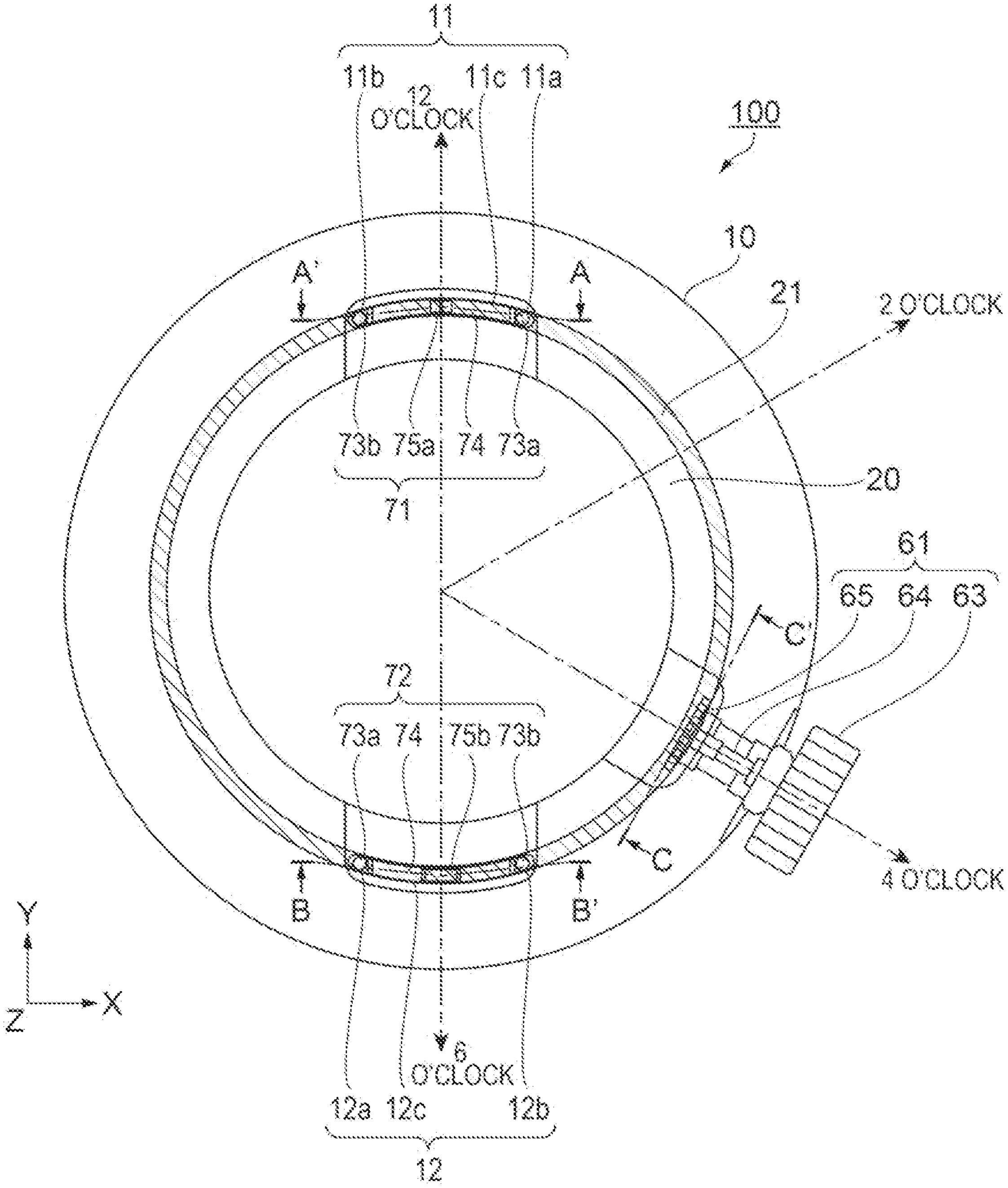
FIG. 3 is a plan view showing the internal configuration of the timepiece.
Figure 4:
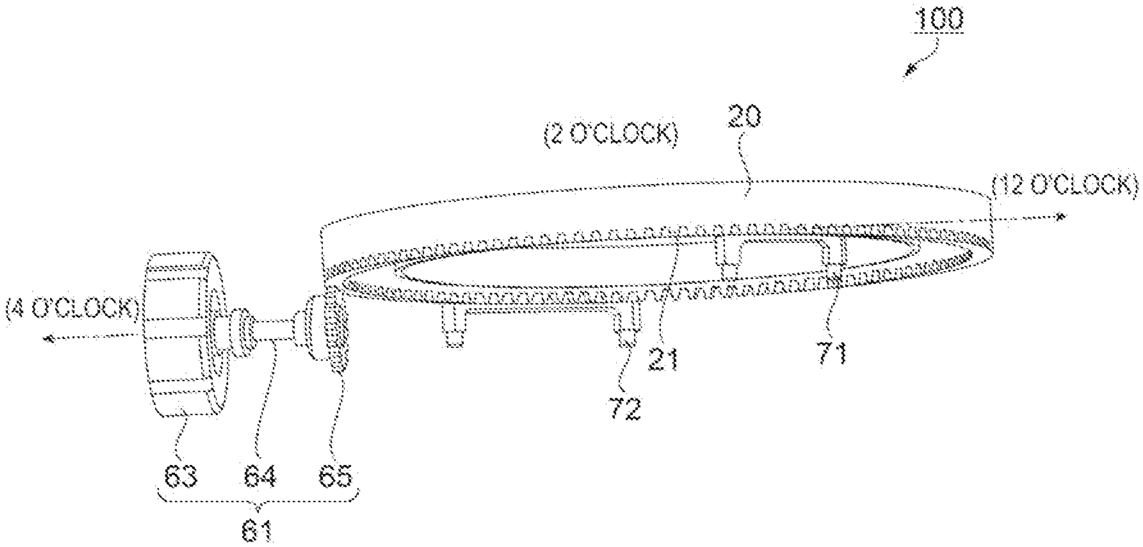
FIG. 4 is a perspective view of the timepiece shown in FIG. 3 as viewed from a direction of approximate 2 o'clock.

FIG. 3 shows a state in which the circular-shaped inner rotating ring 20 is disposed on the case 10 shown in FIG. 2. FIG. 4 is a perspective view of the timepiece 100 shown in FIG. 3 as viewed from a direction of approximate 2 o'clock. Specifically, FIG. 4 shows positional relationships among the inner rotating ring 20, the first elastic member 71, the second elastic member 72, and the driving crown 61.

As shown in FIG. 4, the inner rotating ring 20 is provided with a plurality of teeth portions 21 at a lower side (on a back surface at an opposite side from the display surface). As shown in FIGS. 3 and 4, when the inner rotating ring 20 is disposed on the case 10, the teeth portions 21 of the inner rotating ring 20 mesh with the driving wheel 65 of the driving crown 61. The teeth portions 21 mesh with the first elastic member 71 and the second elastic member 72.

Figure 5:
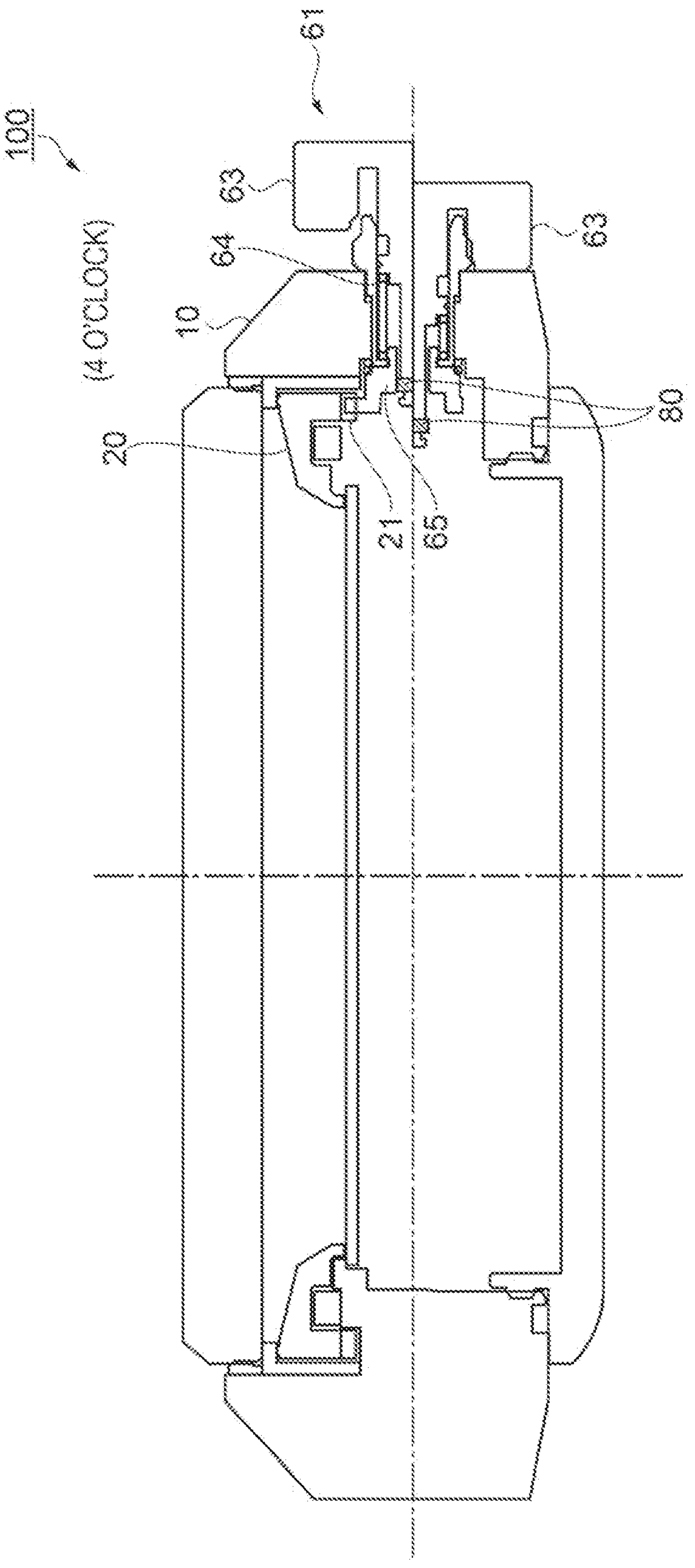
FIG. 5 is a cross-sectional view showing a configuration of the timepiece.

As shown in FIGS. 4 and 5, in order to rotate the inner rotating ring 20, the driving crown 61 as the operation part disposed in the 4 o'clock direction of the timepiece 100 is operated. When the driving crown 61 is pushed toward the case 10, the driving wheel 65 and the shaft portion 64 do not mesh with each other, and thus the inner rotating ring 20 does not rotate even when the driving crown 61 is rotated.

On the other hand, when the driving crown 61 is pulled in a direction away from the case 10, the driving wheel 65 and the shaft portion 64 mesh with each other. When the driving crown 61 is rotated, the head portion 63, the shaft portion 64 penetrating the case 10 and coupled to the head portion 63, and the driving wheel 65 coupled to the shaft portion 64, which constitute the driving crown 61, are rotated, and the inner rotating ring 20 is rotated.

The elastic member 70 is used to prevent unintentional rotation of the inner rotating ring 20 caused by an impact or the like when the inner rotating ring 20 is not rotated, specifically, when the shaft portion 64 and the driving wheel 65 of the driving crown 61 are not meshed with each other (a state at a lower side in FIG. 5).

Specifically, as will be described later, a first protruding portion 75*a* of the first elastic member 71 (see FIG. 9) meshes with the teeth portions 21 of the inner rotating ring 20 separately from the driving wheel 65, so that unintentional rotation of the inner rotating ring 20 is prevented.

As shown in FIG. 3, the first elastic member 71 and the second elastic member 72 always mesh with the teeth portions 21 of the inner rotating ring 20. Specifically, the driving wheel 65 is disposed in the 4 o'clock direction of the case 10. As described above, the first elastic member 71 and the second elastic member 72 are respectively disposed in the 12 o'clock direction and the 6 o'clock direction of the case 10. That is, the first elastic member 71 and the second elastic member 72 are disposed at positions that do not interfere with the driving wheel 65.

Next, a configuration of an engagement portion 80 where the shaft portion 64 and the driving wheel 65 of the driving crown 61 are engaged with each other will be described with reference to FIGS. 6 and 7.

Figure 6:
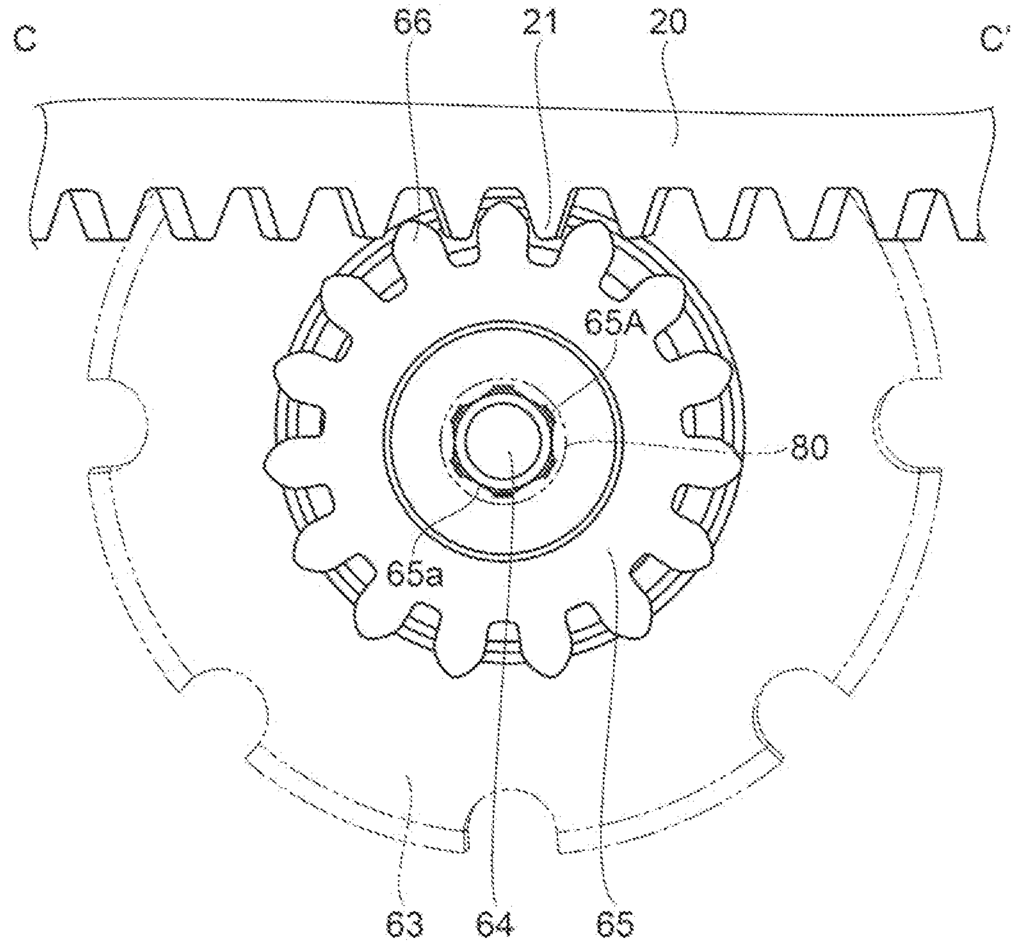
FIG. 6 is a cross-sectional view taken along a line C-C' of the timepiece shown in FIG. 3.

FIG. 6 is a cross-sectional view taken along a line C-C' of the timepiece 100 shown in FIG. 3, in other words, a cross-sectional view as seen from the 4 o'clock direction. FIG. 7 is an enlarged view of the engagement portion 80.

As shown in FIG. 6, as described above, the driving crown 61 includes the head portion 63, the shaft portion 64 coupled to the head portion 63, and the driving wheel 65 including a hole portion 65A engageable with and disengageable from the shaft portion 64. When the driving crown 61 is pushed toward the case 10, the engagement portion 80 between the driving wheel 65 and the shaft portion 64 is disengaged from the shaft portion 64 and the driving wheel 65 (the state at the lower side in FIG. 5). On the other hand, when the driving crown 61 is pulled in a direction away from the case 10, the driving wheel 65 and the shaft portion 64 are engaged with each other at the engagement portion 80 (a state in FIG. 6 and a state at an upper side in FIG. 5).

When the head portion 63 is rotated in a state where the driving wheel 65 and the shaft portion 64 are engaged with each other, the teeth portions 21 of the inner rotating ring 20 move along with rotation of teeth portions 66 of the driving wheel 65, and thus the inner rotating ring 20 rotates.

Figure 7:
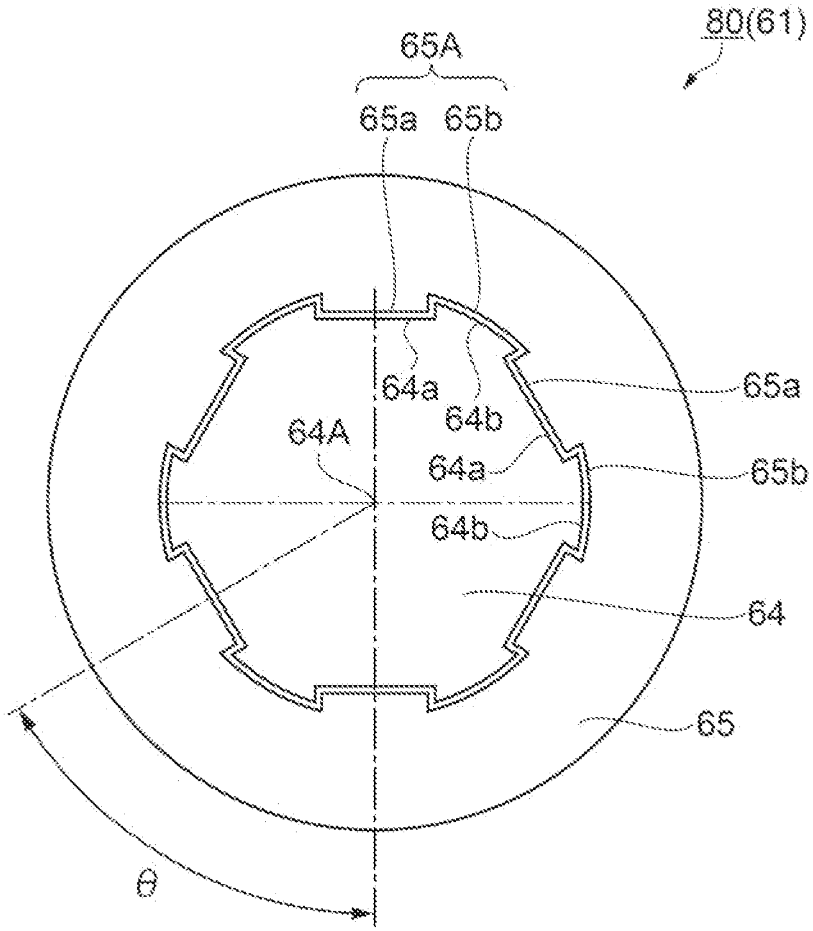
FIG. 7 is a cross-sectional view showing a configuration of an engagement portion between a shaft portion and a driving wheel shown in FIG. 6.

As shown in FIG. 7, the engagement portion 80 is a portion where the shaft portion 64 is engaged with the hole portion 65A of the driving wheel 65. The hole portion 65A of the driving wheel 65 includes a plurality of protruding portions 65*a* as projections protruding toward a rotation axis 64A of the shaft portion 64, and a plurality of recessed portions 65*b* provided between adjacent protruding portions 65*a*. Specifically, the protruding portions 65*a* are disposed at intervals with an angle between the adjacent protruding portions 65*a* smaller than 90°. An angle θ between the adjacent protruding portions 65*a* is preferably, for example, equal to or larger than 40° and equal to or smaller than 80°. In the present embodiment, the protruding portions 65*a* are disposed at six positions, that is, at intervals of 60°.

On the other hand, the shaft portion 64 is formed matching a shape of the hole portion 65A. Specifically, the shaft portion 64 includes a plurality of recessed portions 64*a* recessed toward the rotation axis 64A of the shaft portion 64, and a plurality of protruding portions 64*b* provided between adjacent recessed portions 64*a*. Specifically, the recessed portions 64*a* are disposed at intervals with an angle between the adjacent recessed portions 64*a* smaller than 90°. An angle θ between the adjacent recessed portions 64*a* is preferably, for example, equal to or larger than 40° and equal to or smaller than 80°. In the present embodiment, similarly to the protruding portions 65*a*, the recessed portions 64*a* are disposed at six positions, that is, at intervals of 60°.

It is desirable that a gap between the protruding portion 65*a* of the hole portion 65A and the recessed portion 64*a* of the shaft portion 64, in other words, a gap between the shaft portion 64 and the hole portion 65A is in a range in which mutual rattling is prevented as much as possible and the shaft portion 64 and the hole portion 65A can mesh with each other.

As described above, since the timepiece 100 includes the driving wheel 65 provided with the hole portion 65A including the protruding portions 65*a*, and the driving crown including the shaft portion 64 engageable with and disengageable from the hole portion 65A, a rotational force in a rotation direction of the shaft portion 64 can be reliably transmitted to the driving wheel 65 by using engagement between the protruding portions 65*a* and the recessed portions 64*a*. Therefore, when a large torque is required to rotate the inner rotating ring 20, for example, even when a biasing force is applied to the inner rotating ring 20 by the elastic members 71 and 72, sliding between the shaft portion 64 and the driving wheel 65 can be prevented. Therefore, the inner rotating ring 20 can be rotated along with the rotation of the driving crown 61.

The protruding portions 65*a* are disposed at intervals of a predetermined angle, and thus the shaft portion 64 and the hole portion 65A can be engaged with each other even when a rotation amount of the driving crown 61 is small. In addition, since the shape of the protruding portions 65*a* is prevented from being extremely small or complicated, the strength of the protruding portions 65*a* can be maintained, and productivity of the protruding portions 65*a* can be prevented from being significantly reduced. When the angle θ exceeds 80°, an effect of preventing sliding between the shaft portion 64 and the driving wheel 65 tends to be weakened.

In addition, an engagement amount between the hole portion 65A including the protruding portions 65*a* and the shaft portion 64 including the recessed portions 64*a* can be doubly improved as compared with an engagement amount when the protruding portions 65*a* and the recessed portions 64*a* are not provided as in the related art, and thus the sliding between the shaft portion 64 and the driving wheel 65 can be prevented.

Next, specific configurations and functions of the first elastic member 71 and the second elastic member 72 will be described with reference to FIGS. 8 to 11.

Figure 8:
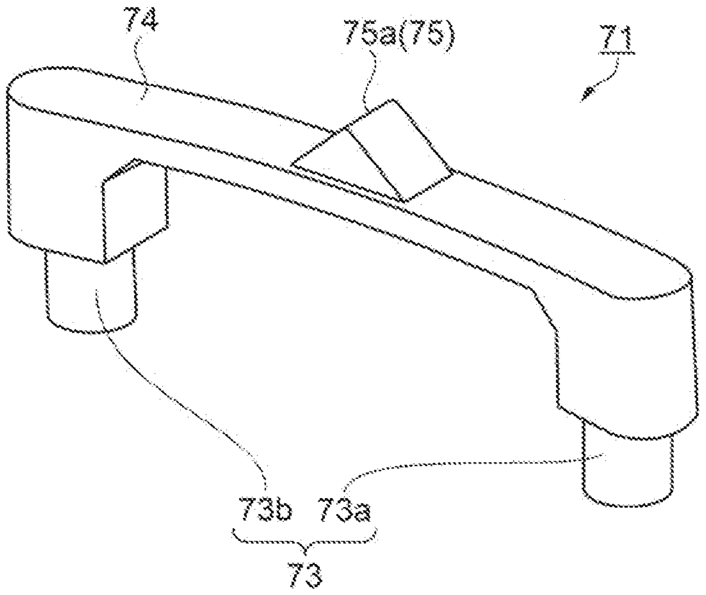
FIG. 8 is a perspective view showing a configuration of a first elastic member.

As shown in FIG. 8, the first elastic member 71 includes a leg portion 73, an extension portion extending from the leg portion 73, and a protruding portion 75 coupled to the extension portion. Specifically, the leg portion 73 includes a first leg portion 73*a* and a second leg portion 73*b*. The extension portion is a beam portion 74 crossing over the first leg portion 73*a* and the second leg portion 73*b*. The protruding portion 75 is a first protruding portion 75*a* that is provided substantially at a center of the beam portion 74 and has a triangular shape in a side view.

As described above, since the first protruding portion 75*a* is provided at the beam portion 74 crossing over the first leg portion 73*a* and the second leg portion 73*b*, the first elastic member 71 can be stabilized, and the first protruding portion 75*a* can mesh with the teeth portions 21 with a stable force. As a result, unintentional rotation of the inner rotating ring 20 can be prevented.

Figure 9:
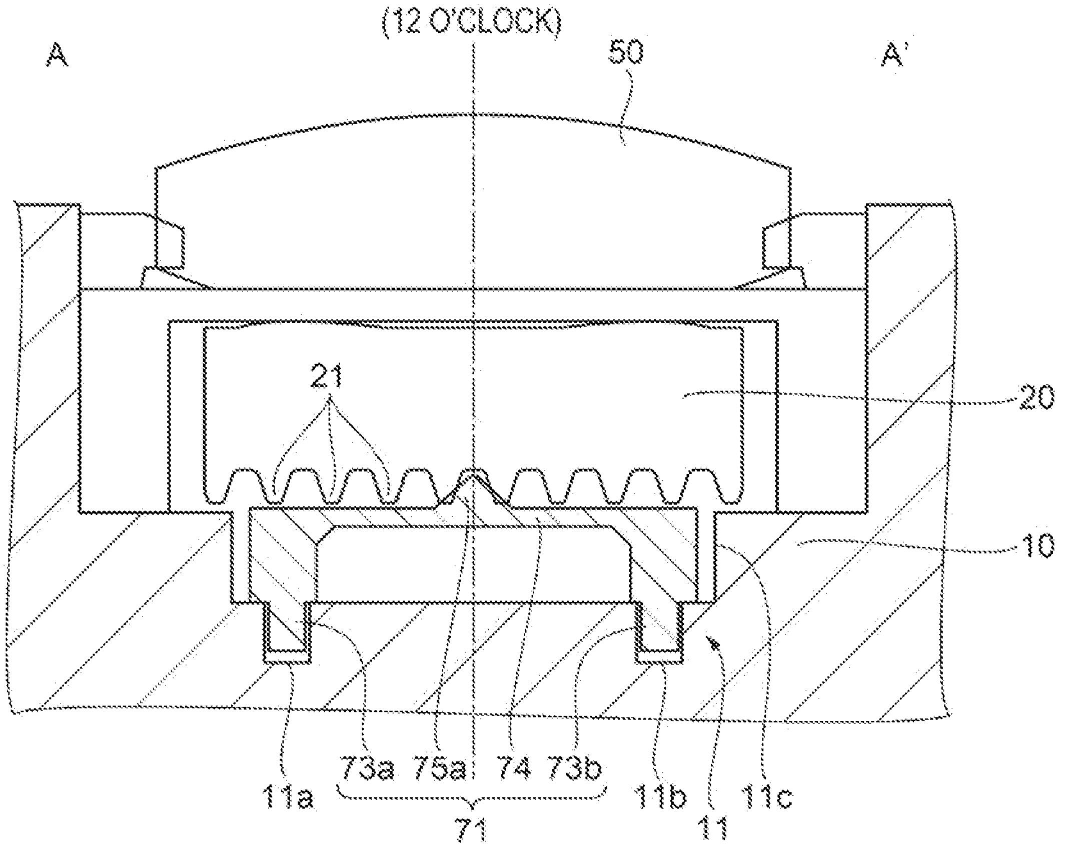
FIG. 9 is a cross-sectional view taken along a line A-A' of the timepiece shown in FIG. 3.

FIG. 9 is a cross-sectional view along a line A-A' of the timepiece 100 shown in FIG. 3. As shown in FIG. 9, the first elastic member 71 is disposed in a recessed portion 11 provided in the case 10. Specifically, the recessed portion 11 includes a first recessed portion 11*a* that meshes with the first leg portion 73*a* of the first elastic member 71, a second recessed portion 11*b* that meshes with the second leg portion 73*b* of the first elastic member 71, and a third recessed portion 11*c* at which the beam portion 74 of the first elastic member 71 is disposed.

The inner rotating ring 20 is disposed on the first elastic member 71. Specifically, as described above, the inner rotating ring 20 is provided with the plurality of teeth portions 21 at a back surface side. The first protruding portion 75*a* of the first elastic member 71 meshes with one teeth portion 21 of the plurality of teeth portions 21 of the inner rotating ring 20.

The plurality of teeth portions 21, for example, 60 teeth portions 21 are formed at a uniform pitch in a circumferential direction. That is, an angle between adjacent teeth portions 21 is 6° in a plan view. The number and the angle of the teeth portions 21 are not limited to this example. The first protruding portion 75*a* of the first elastic member 71 is formed in substantially the same shape as the pitch between the teeth portions 21.

In this manner, the teeth portion 21 of the inner rotating ring 20 meshes with the first protruding portion 75*a* of the first elastic member 71, and thus unintentional rotation of the inner rotating ring 20 can be prevented even when the shaft portion 64 and the driving wheel 65 of the driving crown 61 do not mesh with each other. In addition, when the shaft portion 64 and the driving wheel 65 of the driving crown 61 mesh with each other, the teeth portions 21 and the first protruding portion 75*a* are in contact with each other at a regular interval when the inner rotating ring 20 is rotated in the circumferential direction, and thus a click feeling can be obtained.

Figure 10:
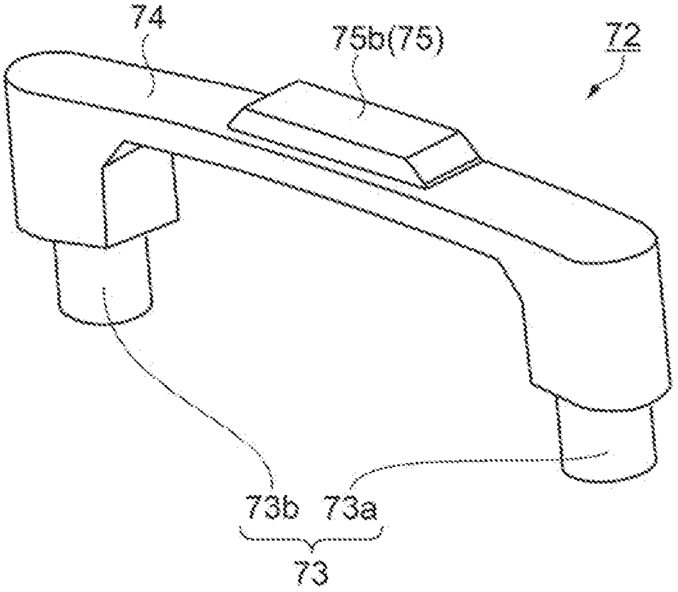
FIG. 10 is a perspective view showing a configuration of a second elastic member.

As shown in FIG. 10, the second elastic member 72 includes a first leg portion 73*a*, a second leg portion 73*b*, a beam portion 74 crossing over the first leg portion 73*a* and the second leg portion 73*b*, and a second protruding portion 75*b* provided substantially at a center of the beam portion 74 and having a substantially trapezoidal shape in a side view. Specifically, the second protruding portion 75*b* has a flat portion longer than the pitch between the teeth portions 21 of the inner rotating ring 20.

Figure 11:
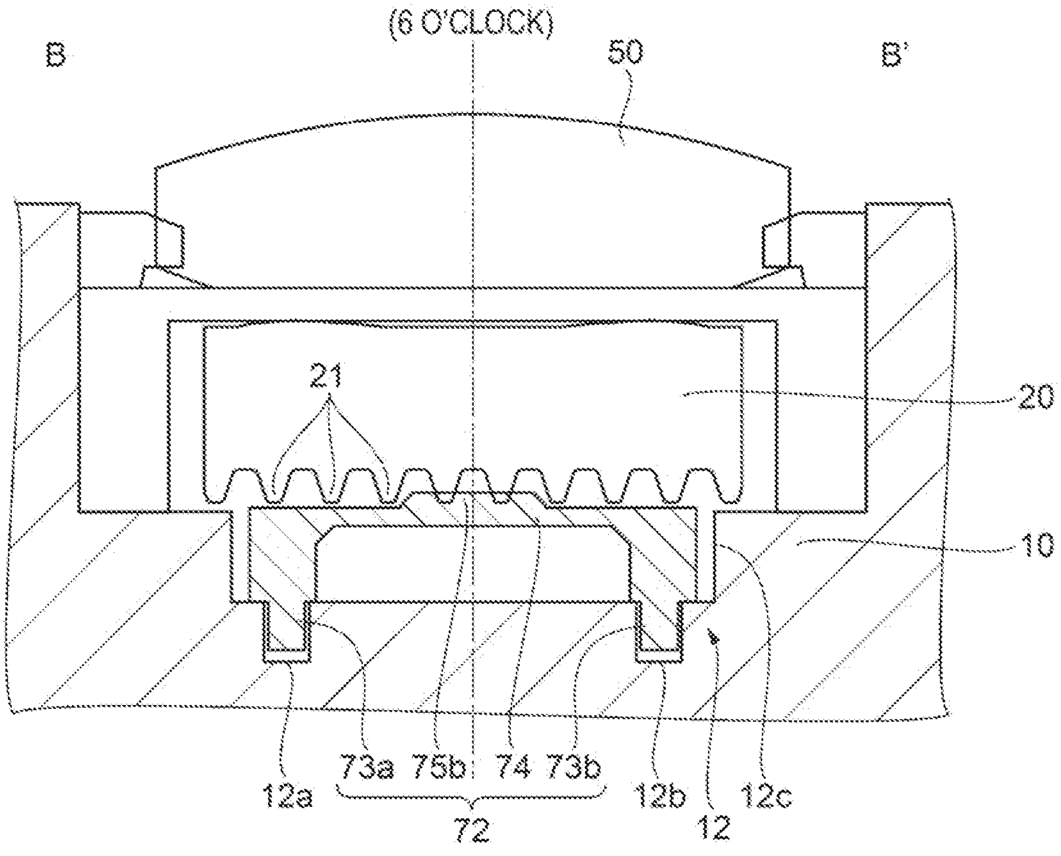
FIG. 11 is a cross-sectional view taken along a line B-B' of the timepiece shown in FIG. 3.

FIG. 11 is a cross-sectional view taken along a line B-B' of the timepiece 100 shown in FIG. 3. As shown in FIG. 11, the second elastic member 72 is disposed in a recessed portion 12 provided in the case 10. Specifically, the recessed portion 12 includes a first recessed portion 12*a* that meshes with the first leg portion 73*a* of the second elastic member 72, a second recessed portion 12*b* that meshes with the second leg portion 73*b* of the second elastic member 72, and a third recessed portion 12*c* at which the beam portion 74 of the second elastic member 72 is disposed.

The inner rotating ring 20 is disposed on the second elastic member 72. Specifically, as described above, the inner rotating ring 20 is provided with the plurality of teeth portions 21 at a back surface side. The second protruding portion 75*b* of the second elastic member 72 is in contact with the plurality of teeth portions 21 of the inner rotating ring 20 in a manner of crossing thereover, and pushes the plurality of teeth portions 21 upward.

In this manner, when the first protruding portion 75*a* of the first elastic member 71 meshes with the teeth portion 21, the second protruding portion 75*b* of the second elastic member 72 pushes the teeth portion 21, so that occurrence of rattling in the inner rotating ring 20 can be prevented. Further, since the inner rotating ring 20 is supported by the first elastic member 71 and the second elastic member 72, balance of the inner rotating ring 20 can be maintained, and unintentional rotation of the inner rotating ring 20 can be prevented.

As described above, the timepiece 100 according to the present embodiment includes the inner rotating ring 20 including the plurality of teeth portions 21, the driving crown 61 including the head portion 63 and the shaft portion 64, and the driving wheel 65 including the hole portion 65A engageable with and disengageable from the shaft portion 64 and meshing with the teeth portions 21, and the hole portion 65A includes the plurality of protruding portions 65*a* disposed at intervals of an angle θ smaller than 90° and protruding toward the rotation axis 64A of the shaft portion 64.

According to this configuration, since the timepiece 100 includes the driving wheel 65 provided with the hole portion 65A including the protruding portions 65*a*, and the driving crown 61 including the shaft portion 64 engageable with and disengageable from the hole portion 65A, the rotational force in the rotation direction of the shaft portion 64 can be reliably transmitted to the driving wheel 65 by using the engagement between the protruding portions 65*a* and the recessed portions 64*a*. Therefore, even when a large torque is required to rotate the inner rotating ring 20, the sliding between the shaft portion 64 and the driving wheel 65 can be prevented, a rotational force of the head portion 63 can be transmitted to the inner rotating ring 20 via the driving wheel 65, and the inner rotating ring 20 can be rotated. In addition, since the protruding portions 65*a* are provided, the shaft portion 64 and the driving wheel 65 can be reliably engaged with each other even when the shaft portion 64 is rotated by a small amount, and operability can be improved.

In the timepiece 100 according to the present embodiment, the angle θ may be equal to or larger than 40° and equal to or smaller than 80°. According to this configuration, since the protruding portions 65*a* are disposed at a predetermined angle θ in the above range, the shaft portion 64 and the hole portion 65A can be engaged with each other even when the rotation amount of the driving crown 61 is small. In addition, since the shape of the protruding portions 65*a* is prevented from being reduced, the strength of the protruding portions 65*a* can be maintained, and the productivity of the protruding portions 65*a* can be prevented from being significantly reduced.

In the timepiece 100 according to the present embodiment, the shaft portion 64 may be made of a metal material, and the driving wheel 65 may be made of plastic. According to the configuration, since the protruding portions 65*a* are provided, the rotational force of the shaft portion 64 made of the metal material can be reliably transmitted to the plastic driving wheel 65 even when the metal material and the plastic are engaged with each other.

In addition, the timepiece 100 according to the present embodiment may include the first elastic member 71 including the first protruding portion 75*a* that meshes with the teeth portions 21. According to the configuration, since the first elastic member 71 is provided, the teeth portion 21 and the first protruding portion 75*a* can be in contact with each other at a regular interval when the inner rotating ring is rotated, and a click feeling can be obtained. In addition, since the first elastic member 71 is disposed, even when a large torque is required to rotate the inner rotating ring 20, a rotational force of the driving crown 61 can be transmitted to the inner rotating ring 20 due to the provided protruding portion 65*a*, and the inner rotating ring 20 can be rotated.

In the timepiece 100 according to the present embodiment, the elastic member 70 may include the first elastic member 71, and the second elastic member 72 disposed at a position different from and at an opposite side from the first elastic member 71 in an in-plane direction of the inner rotating ring 20. According to the configuration, since the first elastic member 71 and the second elastic member 72 are provided, the inner rotating ring 20 can be prevented from being inclined toward one direction, and the occurrence of rattling can be prevented.

Hereinafter, modifications of the above embodiment will be described.

Figure 12:
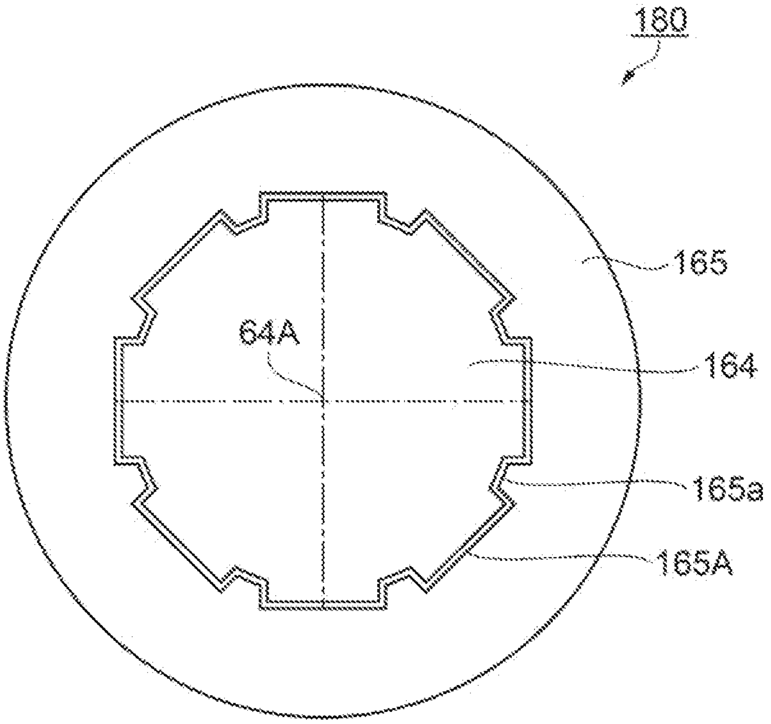
FIG. 12 is a cross-sectional view showing a configuration of an engagement portion according to a modification.
Figure 13:
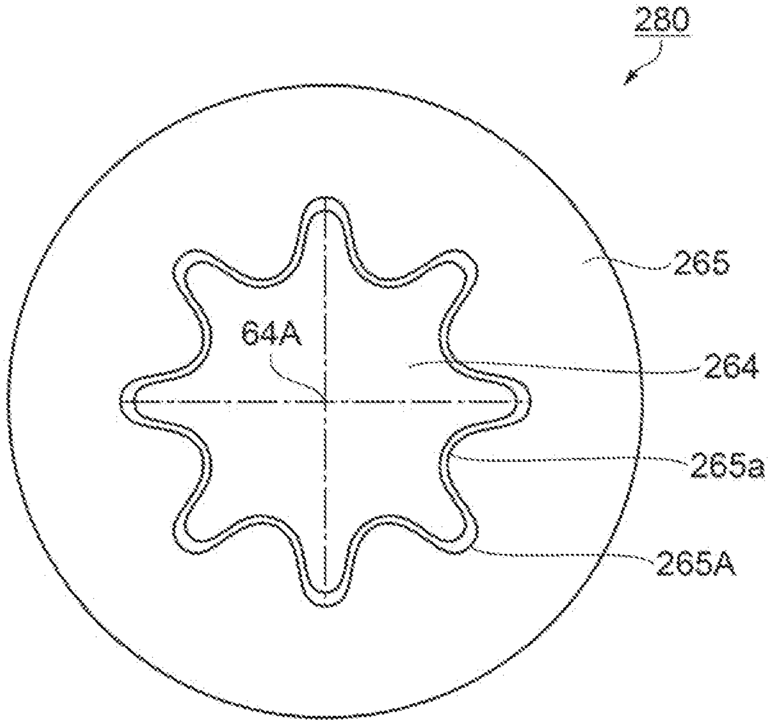
FIG. 13 is a cross-sectional view showing a configuration of an engagement portion according to a modification.

As described above, the shape of the engagement portion 80 is not limited to a substantially hexagonal shape in which the protruding portions 65*a* are disposed at intervals of 60° as shown in FIG. 7, and may be any shape with easy meshing and generated torque, and may be shapes shown in FIGS. 12 and 13. FIGS. 12 and 13 are cross-sectional views showing shapes of engagement portions 180 and 280 according to modifications.

In the engagement portion 180 according to the modification shown in FIG. 12, a hole portion 165A is formed to have a substantially octagonal shape. Protruding portions 165*a* are formed at intervals of 45° in the hole portion 165A. As described above, a shape of a shaft portion 164 is formed matching the shape of the hole portion 165A including the protruding portions 165*a*.

In the engagement portion 280 according to the modification shown in FIG. 13, a hole portion 265A is formed to have a substantially wavy shape. Protruding portions 265*a* are formed at intervals of 45° in the hole portion 265A. As described above, a shape of a shaft portion 264 is formed matching the shape of the hole portion 265A including the projections 265*a*.

In addition, the hole portions 65A, 165A, or 265A and the shaft portions 64, 164, or 264 may have a hexagonal shape, an octagonal shape, or a polygonal shape having more angles, and the number of the protruding portions 65*a*, 165*a*, or 265*a* is not particularly limited as well.

The engagement portions 80, 180, or 280 is not limited to having a shape of protruding toward the rotation axis 64A of the shaft portions 64, 164, or 264, and may have a shape protruding toward an opposite direction from the rotation axis 64A. Further, the protruding portions 65*a* of the driving wheel 65 are disposed at intervals of an angle θ smaller than 90° and protrude toward the rotation axis 64A of the shaft portion 64, but a configuration may be adopted in which the recessed portions 65*b* of the driving wheel 65 is disposed at intervals of an angle θ smaller than 90°, and the protruding portions 65*a* of the driving wheel 65 protruding toward the rotation axis 64A may be provided between the recessed portions 65*b* of the driving wheel 65 that are disposed at intervals.

What is claimed is:

1. A timepiece comprising:

an inner rotating ring including a plurality of first teeth;

an operation part including a head and a shaft, the operation part being configured to move along a rotation axis of the shaft by push and pull operations by a user; and a driving wheel that is ring-shaped, the driving wheel having a plurality of second teeth in an outer surface and a plurality of projections in an inner surface to form a hole, the hole being engageable with and disengageable from the shaft, the plurality of second teeth being configured to mesh with the plurality of first teeth at a first engagement position, wherein the plurality of projections are disposed at intervals of an angle smaller than 90° and protrude toward the rotation axis of the shaft, the shaft of the operation part is configured to engage with the plurality of projections of the driving wheel at a second engagement position, and the first engagement position is shifted from the second engagement position along the rotation axis in a plan view.

2. The timepiece according to claim 1, wherein the angle is equal to or larger than 40° and equal to or smaller than 80°.

3. The timepiece according to claim 1, wherein the shaft includes a plurality of recessed portions configured to mesh with the plurality of projections.

4. The timepiece according to claim 1, wherein the shaft contains a metal material, and the driving wheel contains plastic.

5. The timepiece according to claim 1, further comprising:

a case in which the inner rotating ring and the driving wheel are disposed, wherein when the operation part is pulled in a direction away from the case, the driving wheel and the shaft are engaged with each other, and when the operation part is pushed toward the case, the driving wheel and the shaft are disengaged from each other.

6. The timepiece according to claim 1, further comprising:

an elastic member including a protruding portion configured to mesh with the plurality of first teeth.

7. The timepiece according to claim 6, wherein the elastic member includes a first elastic member and a second elastic member, and the second elastic member is disposed at a position different from that of the first elastic member in an in-plane direction of the inner rotating ring.

* * * * *